United States Patent [19]

Watanabe et al.

[11] Patent Number: 4,741,893
[45] Date of Patent: May 3, 1988

[54] PROCESS FOR PRODUCING FLUORIDES OF METALS

[75] Inventors: Morio Watanabe, Hyogo; Sanji Nishimura, Kyoto, both of Japan

[73] Assignee: Solex Research Corporation of Japan, Japan

[21] Appl. No.: 872,623

[22] Filed: Jun. 9, 1986

Related U.S. Application Data

[63] Continuation of Ser. No. 713,440, Mar. 19, 1985, abandoned.

[30] Foreign Application Priority Data

| Mar. 19, 1984 | [JP] | Japan | 59-51122 |
| Apr. 28, 1984 | [JP] | Japan | 59-85183 |
| Jul. 31, 1984 | [JP] | Japan | 59-159125 |

[51] Int. Cl.$^4$ .............. B01D 11/04; C01B 9/08; C01C 1/16
[52] U.S. Cl. .................. 423/471; 423/21.5; 423/49; 423/54; 423/87; 423/89; 423/139; 423/464; 423/470; 423/489; 423/DIG. 14
[58] Field of Search .............. 423/21.5, 63, 70, 112, 423/114, 263, 464, 465, 470, 471, 489, 49, 51, 54, 87, 89, 94, 99, 139, 463, DIG. 14; 75/101 BE; 210/676, 688

[56] References Cited

U.S. PATENT DOCUMENTS

| 2,757,081 | 7/1956 | Huré et al. | 423/70 |
| 3,067,010 | 12/1962 | Long et al. | 423/70 |
| 3,146,063 | 8/1964 | Moore et al. | 423/21.5 |
| 3,647,366 | 3/1972 | Thoonen | 423/465 |
| 3,685,962 | 8/1972 | Kiovsky et al. | 423/471 |
| 3,804,941 | 4/1974 | Coad et al. | 423/54 |
| 3,812,232 | 5/1974 | Bauer et al. | 423/54 |
| 3,907,966 | 9/1975 | Skarbo | 423/139 |
| 3,984,520 | 10/1976 | Cardwell et al. | 423/49 |
| 4,390,508 | 6/1983 | Watanabe et al. | 423/112 |
| 4,432,949 | 2/1984 | Hubred et al. | 423/54 |
| 4,599,153 | 7/1986 | Bright | 423/49 |

FOREIGN PATENT DOCUMENTS

| 698700 | 11/1964 | Canada | 423/54 |
| 90119 | 10/1983 | European Pat. Off. | 423/99 |
| 3249356 | 5/1984 | Fed. Rep. of Germany | 423/63 |
| 183325 | 11/1982 | Japan | 423/70 |
| 907465 | 10/1962 | United Kingdom | 423/54 |
| 451621 | 6/1975 | U.S.S.R. | 423/489 |

OTHER PUBLICATIONS

*Advances in Inorganic Chemistry and Radiochemistry*, ed. by Eméleus and Sharpe, Academic Press, vol. 13, pp. 86–87 (1970), vol. 24, p. 58 (1981).
*Handbook of Solvent Extraction*, ed. by Lo et al., John Wiley & Sons, 1983, p. 809.

Primary Examiner—John Doll
Assistant Examiner—Jeffrey Edwin Russel
Attorney, Agent, or Firm—Toren, McGeady & Associates

[57] ABSTRACT

Process for producing fluorides of Mo, W, Nb, Ta, V, Re, Ti, Zr, Hf, Co, Ni, Cr, Sb, Sn, Zn, Pb, Al and rare earth metals comprising heating fluorine-containing ammonium salts of corresponding metals in a stream of an inert or reducing gas to convert them into fluorides of the metals.

9 Claims, 1 Drawing Sheet

PROCESS FOR PRODUCING FLUORIDES OF METALS

This is a continuation of application Ser. No. 713,440, filed Mar. 19, 1985, abandoned.

BACKGROUND OF THE INVENTION

1. Field of the Invention

The present invention relates to a process for producing fluorides of Mo, W, Nb, Ta, V, Re, Ti, Zr, Hf, Co, Ni, Cr, Sb, Sn, Zn, Pb, Al and rare earth metals.

2. Description of the Prior Art

So far, fluorides of these metals (Mo, W, Nb, Ta, V, Re, Ti, Zr, Hf, Co, Ni, Cr, Sb, Sn, Zn, Pb, Al and rare earth metals) have been prepared generally by reacting F gas with purified metals as shown below.

$$Mo + 3F_2 \rightarrow MoF_6$$
$$W + 3F_2 \rightarrow WF_6$$
$$Nb + 2.5F_2 \rightarrow NbF_5$$
$$Ta + 2.5F_2 \rightarrow TaF_5$$
$$V + 2.5F_2 \rightarrow VF_5$$
$$Re + 3F_2 \rightarrow ReF_6$$
$$La + 1.5F_2 \rightarrow LaF_3$$
$$Ce + 1.5F_2 \rightarrow CeF_3$$
$$Nd + 1.5F_2 \rightarrow NdF_3$$
$$Sm + 1.5F_2 \rightarrow SmF_3$$
$$Eu + 1.5F_2 \rightarrow EuF_3$$
$$Gd + 1.5F_2 \rightarrow GdF_3$$
$$Tb + 2F_2 \rightarrow TbF_4$$
$$Tm + 1.5F_2 \rightarrow TmF_3$$
$$Lu + 1.5F_2 \rightarrow LuF_3$$
$$Y + 1.5F_2 \rightarrow YF_3$$
$$Sc + 1.5F \rightarrow ScF_3$$
$$Ti + 2F_2 \rightarrow TiF_4$$
$$Zr + 2F_2 \rightarrow ZrF_4$$
$$Hf + 2F_2 \rightarrow HfF_4$$
$$Co + F_2 \rightarrow CoF_2$$
$$Ni + F_2 \rightarrow NiF_2$$
$$Cr + 1.5F_2 \rightarrow CrF_3$$
$$Sb + 1.5F_2 \rightarrow SbF_3$$
$$Cd + F_2 \rightarrow CdF_2$$
$$Sn + 2F_2 \rightarrow SnF_4$$
$$Zn + F_2 \rightarrow ZnF_2$$
$$Pb + F_2 \rightarrow PbF_2$$
$$Al + 1.5F_2 \rightarrow AlF_3$$

There is a further method, other than above, for producing fluorides of the metals in which purified oxides of the metals react with $F_2$ gas. However, the produced fluorides must be very expensive because of the high costs of the metals, metal oxides and the expensive $F_2$ gas.

SUMMARY OF THE INVENTION

The present invention provides a process for producing high purity metal fluorides directly from naturally occurring mineral resources or industrial exhausts, instead of employing expensive raw materials. This invention overcomes difficulties of previous processes such as time-consuming operation and high costs.

The essence of this invention lies in the method in which fluorine-containing ammonium salts of Mo, W, Nb, Ta, V, Re, Ti, Zr, Hf, Co, Ni, Cr, Sb, Sn, Zn, Pb, Al and rare earth metals are heated for decomposition in a stream of an inert or reducing gas, to produce fluorides of respective metals as shown hereinafter.

DETAILED DESCRIPTION OF THE INVENTION

Figure 1:
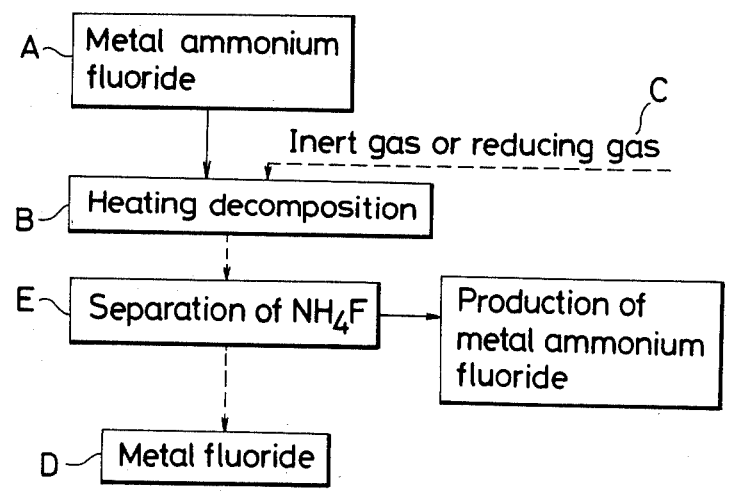
FIG. 1 is a diagram of the stage for producing metal fluorides of the present invention and FIG. 2 is a diagram of the stage for extracting the fluorine-containing ammonium salts used in this invention as the starting materials.

The rare earth metals in this invention refer to lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), luthetium (Lu), yttrium (Y) and scandium (Sc).

$$(NH_4)_2MoF_8 \rightarrow 2NH_4F + MoF_6$$
$$(NH_4)_2MoOF_6 \rightarrow 2NH_4F + \tfrac{1}{2}MoF_6 + \tfrac{1}{2}MoO_2 + \tfrac{1}{2}F_2$$
$$(NH_4)_2WF_8 \rightarrow 2NH_4F + WF_6$$
$$NH_4WOF_5 \rightarrow NH_4F + \tfrac{1}{2}WF_6 + \tfrac{1}{2}WO_2 + \tfrac{1}{2}F_2$$
$$(NH_4)_2NbF_7 \rightarrow 2NH_4F + NbF_5$$
$$(NH_4)_2NbOF_5 \rightarrow 2NH_4F + \tfrac{1}{2}NbF_5 + \tfrac{1}{2}NbO_2 + \tfrac{1}{4}F_2$$
$$(NH_4)_2TaF_7 \rightarrow 2NH_4F + TaF_5$$
$$NH_4VOF_4 \rightarrow NH_4F + \tfrac{1}{2}VF_4 + \tfrac{1}{2}VO_2 + \tfrac{1}{2}F_2$$
$$(NH_4)_2VOF_5 \rightarrow 2NH_4F + \tfrac{1}{2}VF_5 + \tfrac{1}{2}VO_2 + \tfrac{1}{4}F_2$$
$$(NH_4)_2ReF_6 \rightarrow 2NH_4F + ReF_4$$
$$(NH_4)_2LaF_5 \rightarrow 2NH_4F + LaF_3$$
$$(NH_4)_3CeF_6 \rightarrow 3NH_4F + CeF_3$$
$$(NH_4)_2NdF_5 \rightarrow 2NH_4F + NdF_3$$

$(NH_4)_3SmF_6 \rightarrow 3NH_4F + SmF_3$ $(NH_4)_3EuF_6 \rightarrow 3NH_4F + EuF_3$ $(NH_4)_3GdF_6 \rightarrow 3NH_4F + GdF_3$ $(NH_4)_2TbF_6 \rightarrow 2NH_4F + TbF_4$ $NH_4TmF_4 \rightarrow NH_4F + TmF_3$ $NH_4LuF_4 \rightarrow NH_4F + LuF_3$ $NH_4YF_4 \rightarrow NH_4F + YF_3$ $NH_4ScF_4 \rightarrow NH_4F + ScF_3$ $(NH_4)_2TiF_6 \rightarrow 2NH_4F + TiF_4$ $(NH_4)_2TiF_5 \rightarrow 2NH_4F + TiF_3$ $(NH_4)_2ZrF_6 \rightarrow 2NH_4F + ZrF_4$ $(NH_4)_3ZrF_7 \rightarrow 3NH_4F + ZrF_4$ $(NH_4)_2HfF_6 \rightarrow 2NH_4F + HfF_4$ $(NH_4)_3HfF_7 \rightarrow 3NH_4F + HfF_4$ $(NH_4)_2CoF_4 \rightarrow 2NH_4F + CoF_2$ $(NH_4)_2NiF_4 \rightarrow 2NH_4F + NiF_2$ $(NH_4)_2SnF_6 \rightarrow 2NH_4F + SnF_4 \uparrow$ $(NH_4)_3SbF_6 \rightarrow 3NF_4F + SbF_3 \uparrow$ $(NH_4)_3CrF_6 \rightarrow 3NH_4F + CrF_3$ $(NH_4)_2CdF_4 \rightarrow 2NH_4F + CdF_2$ $(NH_4)_2PbF_4 \rightarrow 2NH_4F + PbF_2$ $(NH_4)_2ZnF_4 \rightarrow 2NH_4F + ZnF_2$ $(NH_4)_3AlF_6 \rightarrow 3NH_4F + AlF_3$ There are other fluorine-containing ammonium salts suitable for the process, other than those listed above. Industrially the salts may be impure crystals, and actually they are often in the form of a mixture or may be a mixture of salts of different valencies.

The composition of the fluorine-containing ammonium salts is not definite, or rather different depending on the aqueous solutions from which corresponding fluorine-containing ammonium salts are formed. Therefore, the present invention is not restricted by the reaction formulae above. When the atmosphere of heating and decomposition is formed by a stream of a reducing gas and the decomposition is carried out at a temperature between 150° to 600° C. (150° to 1000° C. for fluorine-containing ammonium salts of Ti, Zr, Hf, Co, Ni, Cr, Sb, Cd, Sn, Zn, Pb and Al) where the temperature is insufficient to cause metal formation, the same reactions could be obtained as in a stream of an inert gas to prepare various fluorides.

The NH$_4$F obtained by thermal decomposition in a stream of an inert or reducing gas remains in a gaseous form at a higher temperature, but is solidified at a temperature below 200° C., so it is removed for recovery from the decomposition gas by a known method such as separation by filtration. The recovered NH$_4$F can thus be recirculated to the producing stage for fluorine-containing ammonium salts of metals.

The fluorine-containing ammonium salts of metals to be used in this invention can be prepared, for example, as shown below.

The metal ions of Mo, W, Nb, Ta, V, Re, Ti, Zr, Hf, Co, Ni, Cr, Sb, Sn, Zn, Pb, Al and the rare earth metals including complex ions of the same metals, which have been extracted and contained in an organic solvent comprising at least one extracting agent selected from the group consisting of alkylphosphoric acids, ketones, carboxylic acids, neutral phosphoric acid esters, oximes, and primary through quaternary amines, which solvent may optionally contain a petroleum hydrocarbon as diluent, are brought into contact with an aqueous solution containing both F$^-$ and NH$_4^+$ ions, to separate metal ammonium fluorides from the aqueous solution and to regenerate the organic solvents at the same time.

$R_6 \cdot Mo + 6NH_4HF_2 \rightleftharpoons (NH_4)_2MoF_8 + 6R.H + 4NH_4F$ $H_2MoO_4 \cdot 2TBP + 3NH_4HF_2 \rightleftharpoons (NH_4)_2MoOF_6 + 2TBP + NH_4OH + 2H_2O$ $R_6W + 6NH_4HF_2 \rightleftharpoons (NH_4)_2WF_8 + 6R.H + 4NH_4F$ $R_3NH \cdot WO_3 + 2NH_4HF_2 \rightleftharpoons (NH_4)_2WOF_5 + 2R_3N + 2H_2O$ $H_2NbF_7 \cdot 2TBP + 4NH_4OH \rightleftharpoons (NH_4)_2NbOF_5 + 2NH_4F + 3H_2O + 2TBP$ $H_2TaF_7 \cdot 2TBP + 2NH_4F \rightleftharpoons (NH_4)_2TaF_7 + 2TBP \cdot HF$ $R_4 \cdot V + 2NH_4HF_2 + H_2O \rightleftharpoons (NH_4)_2VOF_4 + 4RH$ $(R_3NH)VO_3 + 3NH_4HF_2 \rightleftharpoons (NH_4)_2VOF_5 + R_3N + NH_4F + 2H_2O$ $(R_3NH)_2ReO_3 + 3NH_4HF_2 \rightleftharpoons (NH_4)_2ReF_6 + 2R_3N + 2H_2O + NH_4OH$ $R_3La + 3NH_4HF_2 \rightleftharpoons (NH_4)_3LaF_6 + 3R.H$ $R_3Ce + 3NH_4HF_2 \rightleftharpoons (NH_4)_3CeF_6 + 3R.H$ $R_4Pr + 4NH_4HF_2 \rightleftharpoons (NH_4)_2PrF_6 + 4R.H + 2NH_4F$ $R_3Nd + 3NH_4HF_2 \rightleftharpoons (NH_4)_3NdF_6 + 3R.H$ $R_3Sm + 3NH_4HF_2 \rightleftharpoons (NH_4)_3SmF_6 + 3R.H$ $R_3Eu + 3NH_4HF_2 \rightleftharpoons (NH_4)_3EuF_6 + 3R.H$ $R_3Gd + 3NH_4HF_2 \rightleftharpoons (NH_4)_3GdF_6 + 3R.H$ $R_4Tb + 3NH_4HF_2 \rightleftharpoons (NH_4)_3TbF_6 + 3R.H$ $R_3Tm + 3NH_4HF_2 \rightleftharpoons (NH_4)_3TmF_6 + 3R.H$ $R_3Lu + 3NH_4HF_2 \rightleftharpoons (NH_4)_3LuF_6 + 3R.H$ $R_3Y + 3NH_4HF_2 \rightleftharpoons (NH_4)_3YF_6 + 3R.H$ $R_3Sc + 3NH_4HF_2 \rightleftharpoons (NH_4)_3ScF_6 + 3R.H$ $R_4Ti + 3NH_4HF_2 \rightleftharpoons (MH_4)_2TiF_6 + 3R.H + R.NH_4$ $R_2TiO + 4NH_4HF_2 \rightleftharpoons (NH_4)_2TiF_6 + 2R.H + H_2O + 2NH_4F$ $R_3Ti + 3NH_4HF_2 \rightleftharpoons (NH_4)_2TiF_5 + 3R.H + NH_4F$ $$R_4Zr + 4NH_4HF_2 \rightleftarrows (NH_4)_2ZrF_6 + 4R.H + 2NH_4F$$

$$H_2ZrF_6.nTBP + 2NH_4F \rightleftarrows (NH_4)_2ZrF_6 + nTBP + 2HF$$

$$(R_3NH)_2ZrO(SO_4)_2 + 6NH_4F \rightleftarrows (NH_4)_2ZrOF_4 + 2R_3NH.F + 2(NH_4)_2SO_4$$

$$R_2Co + 2NH_4HF_2 \rightleftarrows (NH_4)_2CoF_4 + 2R.H$$

$$R_2Ni + 2NH_4HF_2 \rightleftarrows (NH_4)_2NiF_4 + 2R.H$$

$$R_3Cr + 3NH_4HF_2 \rightleftarrows (NH_4)_3CrF_6 + 3R.H$$

$$(R_3NH)SbO_2 + 3NH_4HF_2 \rightleftarrows (NH_4)_3SbF_6 + R_3N + 2H_2O$$

$$R_2Cd + 2NH_4HF_2 \rightleftarrows (NH_4)_2CdF_4 + 2R.H$$

$$(R_3NH)_2SnO_3 + 4NH_4HF_2 \rightleftarrows (NH_4)_2SnF_6 + 2R_3N + 3H_2O + 2NH_4F$$

$$R_2Zn + 2NH_4HF_2 \rightleftarrows (NH_4)_2ZnF_4 + 2R.H$$

$$R_2Pb + 2NH_4HF_2 \rightleftarrows (NH_4)_2PbF_4 + 2R.H$$

$$R_3Al + 3NH_4HF_2 \rightleftarrows (NH_4)_3AlF_6 + 3R.H$$

In the equations, R.H is an H-type extractor.

The metal ions and the metal complex ions transferred to the aqueous phase are converted into corresponding fluorine-containing salts of the metal, which are less soluble than other fluorides of the metal in aqueous solutions and much more rapid in the rate of crystal growth. Consequently, the fluorine-containing ammonium compounds thus formed are readily separated by filtration.

As has been described before, metal ammonium fluorides thus obtained are heated in a stream of an inert or reducing gas. Then fluorides of the corresponding metals are produced at a temperature between 150° to 600° C. or between 150° to 1000° C.

$NH_4F$ or $NH_4HF_2$ gas generated from the decomposition can be very easily recovered through an absorption or dust collection process. Moreover the recovered gas can be recycled to the production process of metal ammonium fluorides.

The alkylphosphoric acids to be used in this invention are selected from the group consisting of following compounds:

(a)
$$\begin{array}{c} O \\ \| \\ RO-P-OH \\ | \\ OR \end{array}$$

(b)
$$\begin{array}{c} O \\ \| \\ RO-P-OH \\ | \\ OH \end{array}$$

(c)
$$\begin{array}{c} O \quad\quad O \\ \| \quad\quad \| \\ RO-P-O-P-OR \\ | \quad\quad | \\ OH \quad OH \end{array}$$

(d)
$$\begin{array}{c} O \\ \| \\ R-P-OH \\ | \\ R \end{array}$$

or (e)
$$\begin{array}{c} O \\ \| \\ R-P-OH \\ | \\ OH \end{array}$$

(In the formulae, R is an alkyl group having 4 to 22 carbon atoms in general.)

The compound D$_2$EHPA (di-2-ethylhexylphosphoric acid) appearing in the examples below belongs to Group (a) and the alkyl group is $C_8H_{17}$.

Following is an example of the oxime used as extracting agent in this invention.

[Structural formula of cyclohexane substituted with $C_9H_{19}$, R, C=N-OH, OH, and X]

[Phenyl and benzyl ($-CH_2-$) group structures]

(In the formulae, R is H, CH$_3$, and X is either Cl or H.)

Oximes similar to the above are also useful and a mixture of two or more oximes such as LIX64N (tradename from Henkel Chemicals) may be used. SME-529 appearing in the Example below is a tradename from Shell Chemicals, where R is CH$_3$ and X is H.

The ketone to be used in this invention is selected from the following groups:

$$\begin{array}{c} R \\ \diagdown \\ \quad C=O \\ \diagup \\ R' \end{array}$$

(In the formula, R and R' are alkyl or aryl groups and usually contain 3 to 22 carbon atoms.)

An example of the ketones appearing in the example is cyclohexanone or the compound shown below:

$$\begin{array}{c} CH_3 \\ | \\ CH_3CHCH_2 \\ \diagdown \\ \quad\quad C=O \\ \diagup \\ CH_3 \end{array}$$

The alkyl aryl phosphoric acid used in the present invention is selected from the group having the general formula shown below:

$$\begin{array}{c} O \\ \| \\ RO-P-OH \\ | \\ A \end{array}$$

wherein R is an alkyl group containing 4 to 15 carbon atoms, A is an aryl group (phenyl group, tolyl group, xylyl group).

OPPA (octyl phenyl phosphoric acid) used in the example is such as $R=C_8H_{17}$ and $X=C_6H_5$.

The carboxylic acids to be used as extracting agent in the present invention are selected from the following groups.

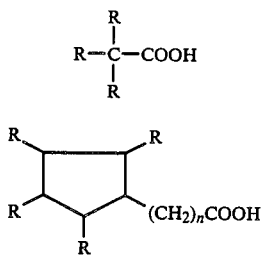

(In the formulae, R is an alkyl group having in general 4 to 22 carbon atoms.)

The compound V-10 (Versatic-10, tradename from Shell Chemicals) appearing in the Example belongs to Group (a), where the alkyl group contains 9 to 15 carbon atoms.

Neutral phosphoric acid esters to be used in this invention are selected from the following groups:

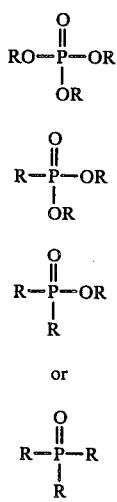

(In the formulae, R is an alkyl group having 4 to 22 carbon atoms.)

Compound TBP (tributylphosphate) used in Example belongs to Group (a), where R is $C_4H_9$.

Primary through quaternary amines to be used in this invention are selected from the following groups;
Primary amines $RNH_2$, where R is an alkyl group having 4 to 25 carbon atoms.
Secondary amines $R_2N-$ or $R_2NH$, where R is an alkyl group having 4 to 25 carbon atoms.
Tertiary amines $R_3N$ or $R_3NH-$, where R is an alkyl group having 4 to 25 carbon atoms.

TOA (Trioctylamine) used in Example is expressed by the expression below.

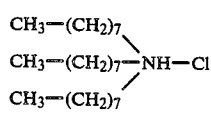

(However, Cl in the formulae could be replaced by another anion.)

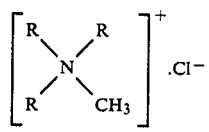

(In the formula, R is an alkyl group having 4 to 25 carbon atoms.)

The diluents to be used in this invention may be petroleum hydrocarbons, aromatic or aliphatic hydrocarbons, or a mixture thereof. Kerosine, a mixture of various hydrocarbons, may even be used. Extracting agents could be selected from a multiplicity of groups and may be used alone or in a mixture. The selection and the mixing ratio of extracting agents depend on the nature of the aqueous solution to be applied and the nature and proportion of suspected impurities. Concentrations of extracting agent are similarly determined, but usually a concentration ranging from 2 to 100% (by volume) is preferred.

The $F^-$ ion containing solution to be used in the present invention contains one or more species selected from the group consisting of $NH_4HF_2$, $NH_4F$ optionally plus HF. The solution preferably contains a mole ratio of $F^-/NH_4^+ = 1/1 \sim 1/0.2$ in mole. Further it may contain a reducing agent such as hydrazine, depending on the condition for crystallization.

Inert gases to be used in this invention include argon, helium and nitrogen either alone or in the form of a mixed gases.

Reducing gases to be used in this invention are hydrogen, carbon monoxide and the vapor of hydrocarbons.

Following is a detailed explanation of this invention with reference to the drawings. However, this invention is not restricted to the drawings.

The flow-sheet in FIG. 1 shows a basic process in which fluorides (D) of metals selected from the group consisting of Mo, W, Nb, Ta, V, Re, Ti, Zr, Hf, Co, Ni, Cr, Sb, Sn, Zn, Pb, Al and the rare earth metals are produced from metal ammonium fluorides (A) of corresponding metals by heating the latter to a temperature between 150° to 600° C. or 150° to 1000° C. in a stream of an inert or reducing gas (C) in the heating decomposition stage (B).

The gas produced in the heating and decomposition stage (B) contains $NH_4F$, which is solidified by cooling, and separated (E) by a known method, to obtain metal fluorides (D). The recovered $NH_4F$ is recirculated to the stage in which metal ammonium fluorides are produced.

Figure 2:
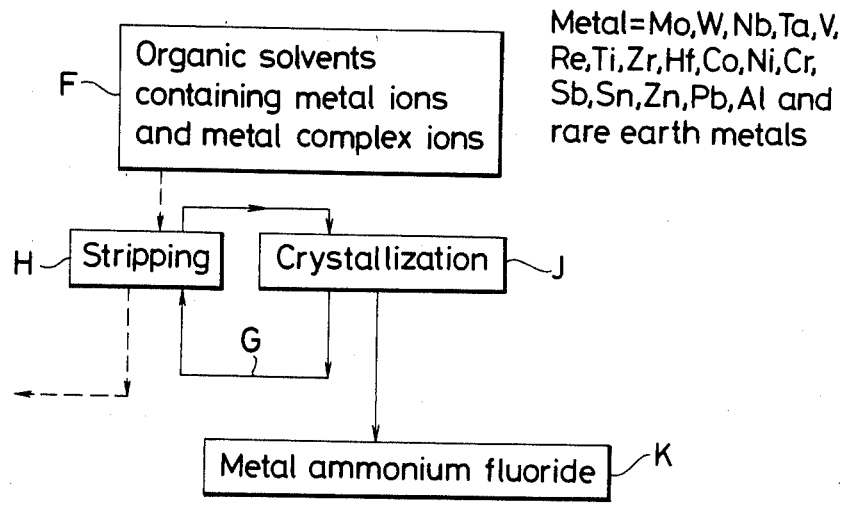

The flow-sheet in FIG. 2 is a basic process for preparing metal ammonium fluorides.

Organic solvents (F) which extract and contain simple and complex ions of a metal selected from the group consisting of Mo, W, Nb, Ta, V, Re, Ti, Zr, Hf, Co, Ni, Cr, Sb, Sn, Zn, Pb, Al and the rare earth metals are brought into contact with an aqueous solution (G) containing $NH_4^+$ and $F^-$ ions in the stripping stage (H), to transfer the metal and the metal complex ions into the aqueous phase and to regenerate the organic solvents for circulation in the extraction stage. The simple and complex ions of metals selected from the group consisting of Mo, W, Nb, Ta, V, Re, Ti, Zr, Hf, Co, Ni, Cr, Sb, Sn, Zn, Pb, Al and the rare earth metals contained in the aqueous phase are separated in the crystallization stage (J), to obtain crystals of the metal ammonium fluorides.

The present invention will be explained with reference to the examples.

EXAMPLE 1

Each of the samples shown in Table 1 were placed in an annular electric furnace and heated in a nitrogen stream flowing at a rate of 3 cc/min.

EXAMPLE 2

Each of the samples shown in Table 2 were placed in an annular electric furnace and heated in a nitrogen stream flowing at a rate of 0.3 l/minute.

The residues shown in the Table are considered to have been formed by hydrogen bonding in part of the crystals due to the presence of $(NH_4)_2ZrF_6OH_2$. The residues were identified to be oxides. The volatile matters were determined by identifying the condensate obtained by cooling.

The zero gram in the column of the residue weight means all of the crystal volatilized.

at about 230° C. and separating $NH_4F$ and $NH_4HF_2$ by utilizing the differences in vapor pressure.

REFERENCE EXAMPLE

The metal ammonium fluorides to be used as the starting material in this invention may be prepared by known methods of extraction and stripping using the organic solvents and the stripping solutions as listed in Tables 4 to 6.

In the tables, concentration of organic solvents are expressed in percentages by volume.

The rate of stripping is the percentage of the amount of substances which are transferred into the aqueous phase by a single contact when equal volumes of aqueous and organic phases are used. The stripping was conducted in each case at a temperature between 25° to 28° C., and the shaking continued for 10 minutes.

The materials formed were examined by the X-ray diffraction analysis or chemical analysis.

MIBK means methylisobutylketone.

TABLE 1

| Sample | Weight | Temperature of heating | Residue Formula | Residue Weight | Volatile matter Formula | Volatile matter Weight |
|---|---|---|---|---|---|---|
| $NH_4MoOF_5$ | 10 g | 350° C. | $MoO_2$ | 2.8 g | $MoF_6 + NH_4F$ | 4.6 g |
| $NH_4WOF_5$ | " | 300° C. | $WO_2$ | 3.4 g | $WF_6 + NH_4F$ | 4.8 g |
| $(NH_4)_2NbOF_5$ | " | 450° C. | $NbO_2F$ | 3.2 g | $NbF_5 + NH_4F$ | 4.2 g |
| $(NH_4)_2TaF_7$ | " | 250° C. | none | 0 g | $TaF_5 + NH_4F$ | 7.9 g |
| $(NH_4)_2VOF_4$ | " | 400° C. | $VO_2$ | 2.3 g | $VF_4 + NH_4F$ | 3.5 g |
| $(NH_4)_2ReF_6$ | " | 280° C. | $ReF_4$ | 7.8 g | $NH_4F$ | 2.2 g |
| $(NH_4)_3LaF_6$ | " | 420° C. | $LaF_3$ | 6.3 g | " | 3.7 g |
| $(NH_4)_3NdF_6$ | " | 450° C. | $NdF_3$ | 6.4 g | " | 3.6 g |
| $(NH_4)_3SmF_6$ | " | 400° C. | $SmF_3$ | 6.5 g | " | 3.5 g |
| $(NH_4)_3EuF_6$ | " | 300° C. | $EuF_3$ | 6.5 g | " | 3.5 g |
| $(NH_4)_3GdF_6$ | " | 350° C. | $GdF_3$ | 6.6 g | " | 3.4 g |
| $(NH_4)_3TmF_6$ | " | 400° C. | $TmF_3$ | 6.7 g | " | 3.3 g |
| $(NH_4)_3TbF_6$ | " | 250° C. | $TbF_3$ | 6.6 g | " | 3.4 g |
| $(NH_4)_3YF_6$ | " | 450° C. | $YF_3$ | 5.7 g | " | 4.4 g |

Remarks:
In Table 1, the substances left in the ring furnace after heating are identified and listed by their formula and weight in the column "Residue" and the "Volatile matters" which were cooled and identified are listed in the 6th and 7th columns. The "none" in the residue column means complete evaporation leaving nothing. Blanks in the column "weight" means that the total weight of the residue could not be recovered.

EXAMPLE 3

Each of the samples shown in Table 3 were placed in an annular electric furnace and heated in a nitrogen stream flowing at a rate of 0.3 l/minute. The volatile matters and the condensates in the table were determined by maintaining the gas coming out of the system

TABLE 2

| Sample | Weight | Temperature of heating | Residue weight | Volatile matter Formula | Volatile matter Weight |
|---|---|---|---|---|---|
| $(NH_4)_2TiF_6$ | 30 g | 400° C. | $TiF_4$ 18.8 g | $NH_4F$ | 11.2 g |
| $(NH_4)_2ZrF_6$ | 30 g | 500° C. | $ZrF_4$ 20.5 g | $NH_4F$ | 9.5 g |
| $(NH_4)_2HfF_6$ | 30 g | 500° C. | $HfF_4$ 23.1 g | $NH_4F$ | 6.9 g |

TABLE 3

| Sample | Weight | Temperature of heating | Residue weight | Volatile matter Formula | Volatile matter Weight |
|---|---|---|---|---|---|
| $(NH_4)_2CoF_4$ | 30 g | 500° C. | $CoF_2$ 17 g | $NH_4F$ | 13 g |
| $(NH_4)_2NiF_4$ | 30 g | 500° C. | $NiF_2$ 17 g | $NH_4F$ | 13 g |
| $(NH_4)_3CrF_6$ | 30 g | 800° C. | $CrF_2$ 14.9 g | $NH_4F$ | 15.1 g |
| $(NH_4)_3SbF_6$ | 30 g | 500° C. | 0 g (Condensate 18.5 g) | $SbF_3 + 3NH_4F$ | 30 g |
| $(NH_4)_2CdF_4$ | 30 g | 500° C. | $CdF_2$ 20.1 g | $NH_4F$ | 9.9 g |
| $(NH_4)_2SnF_6$ | 30 g | 500° C. | 0 g (Condensate 21.7 g) | $SnF_4 + NH_4F$ | 30 g |
| $(NH_4)_2ZnF_4$ | 30 g | 500° C. | $ZnF_2$ 17.5 g | $NH_4F$ | 12.5 g |
| $(NH_4)_2PbF_4$ | 30 g | 600° C. | $PbF_2$ 23 g | $NH_4F$ | 7 g |
| $(NH_4)_3AlF_6$ | 30 g | 800° C. | $AlF_3$ 12.9 g | $NH_4F$ | 17.8 g |

TABLE 4

| Metal | Organic solvent | Stripping solution | Rate of stripping | Example of product |
|---|---|---|---|---|
| Mo | 60% TBP + 40% isoparaffin | 100 g/l $NH_4HF_2$ | 99.5% | $(NH_4)_2MoOF_6$ |
| W | 10% TOA + 90% isoparaffin | 150 g/l $NH_4HF_2$ | 99.8% | $NH_4WOF_5$ |

TABLE 4-continued

| Metal | Organic solvent | Stripping solution | Rate of stripping | Example of product |
|---|---|---|---|---|
| Nb | 100% MIBK | 100 g/l $NH_4F$ | 99.1% | $(NH_4)_2NbOF_5$ |
| Ta | 85% TBP + 15% aromatics | 100 g/l $NH_4F$ | 99.8% | $(NH_4)_2TaF_5$ |
| V | 30% $D_2EHPA$ + 70% n-paraffin | 200 g/l $NH_4F$ | 99.1% | $(NH_4)_2VOF_4$ |
| Re | 80% TBP + 20% isoparaffin | 150 g/l $NH_4F$ | 99.8% | $(NH_4)_3ReF_7$ |
| La | 30% $D_2EHPA$ + 70% isoparaffin | 200 g/l $NH_4HF_2$ | 92.7% | $(NH_4)_2LaF_6$ |
| Nd | 30% V-10 + 70% isoparaffin | 150 g/l $NH_4HF_2$ | 94.1% | $(NH_4)_3NdF_6$ |
| Sm | 30% V-10 + 70% isoparaffin | 150 g/l $NH_4HF_2$ | 94.8% | $(NH_4)_3SmF_6$ |
| Eu | 30% $D_2EHPA$ + 70% n-paraffin | 200 g/l $NH_4HF_2$ | 92.8% | $(NH_4)_3EuF_6$ |
| Gd | 30% $D_2EHPA$ + 70% n-paraffin | 200 g/l $NH_4HF_2$ | 93.3% | $(NH_4)_3GdF_6$ |
| Tm | 30% $D_2EHPA$ + 70% n-paraffin | 200 g/l $NH_4HF_2$ | 94.1% | $(NH_4)_3TmF_6$ |
| Tb | 30% $D_2EHPA$ + 70% isoparaffin | 200 g/l $NH_4HF_2$ | 98.4% | $(NH_4)_3TbF_6$ |
| Y | 65% TBP + 35% isoparaffin | 150 g/l $NH_4F$ | 99.8% | $(NH_4)_3YF_6$ |

TABLE 5

| Metal | Organic solvent | Stripping solution | Rate of stripping | Example of product |
|---|---|---|---|---|
| Ti | 30% $D_2EHPA$ + 70% isoparaffin | 150 g/l $NH_4HF_2$ | 99.1% | $(NH_4)_2TiF_6$ |
| Ti | 30% V-10 + 70% n-paraffin | 100 g/l $NH_4HF_2$ | 99.9% | $(NH_4)_2TiF_6$ |
| Zr | 10% TOA + 90% aromatic hydrocarbon | 100 g/l $NH_4F$ | 99.4% | $(NH_4)_2ZrF_6$ |
| Zr | 60% TBP + 40% isoparaffin | 180 g/l $NH_4F$ | 99.6% | $(NH_4)_2ZrF_6$ |
| Hf | 100% MIBK | 200 g/l $NH_4F$ | 94.7% | $(NH_4)_2HfF_6$ |

(MIBK = methylisobutylketone)

TABLE 6

| Metal | Organic solvents containing extracted metal values | Stripping solution | Rate of stripping | Example of product |
|---|---|---|---|---|
| Co | 20% OPPA + 5% SME-529 + 7.5% kerosine | 100 g/l $NH_4HF_2$ | 99.1% | $(NH_4)_2CoF_4$ |
| Ni | 30% $D_2EHPA$ + 70% isoparaffin | 100 g/l $NH_4HF_2$ | 99.9% | $(NH_4)_2NiF_4$ |
| Cr | 30% $D_2EHPA$ + 70% kerosine | 300 g/l $NH_4F$ | 56.1% | $(NH_4)_2CrF_6$ |
| Sb | 20% TBP + 80% isoparaffin | 200 g/l $NH_4HF_2$ | 99% | $(NH_4)_3SbF_6$ |
| Sn | 20% TOA + 80% kerosine | 100 g/l $NH_4F$ | 98.9% | $(NH_4)_2SnF_6$ |
| Pb | 30% V-10 + 70% n-paraffin | 100 g/l $NH_4F$ | 99.4% | $(NH_4)_2PbF_4$ |
| Cd | 30% $D_2EHPA$ + 70% aromatic | 150 g/l $NH_4HF_2$ | 99.8% | $(NH_4)_2CdF_4$ |
| Zn | 30% SME-529 + 70% kerosine | 150 g/l $NH_4F$ | 99.2% | $(NH_4)_2ZnF_4$ |
| Al | 30% OPPA + 70% isoparaffin | 100 g/l $NH_4HF_2$ | 99.6% | $(NH_4)_3AlF_6$ |

What is claimed is:

1. A process for producing fluorides of Mo, W, Re, Co, Ni, Cr, Sb, Sn, Pb and rare earth metals, comprising bringing an organic solvent containing ions or complex ions of a metal selected from the group consisting of Mo, W, Re, Co, Ni, Cr, Sb, Sn, Pb and rare earth metals into contact with an aqueous solution containing $F^-$ ion and $NH_4^+$ ion to transfer the metal ions or metal complex ions into the aqueous phase, said organic solvent being one selected from the group consisting of alkylphosphoric acid, alkyl aryl phosphoric acids, carboxylic acids, oximes, ketones, neutral phosphoric acid esters, and primary through quaternary amines, said solvent being diluted with a petroleum hydrocarbon to separate fluorine-containing ammonium salts from said aqueous solution and to simultaneously regenerate said organic solvent, and heating said fluorine-containing ammonium salts in a stream of inert or reducing gas to decompose said salts into fluorides of the corresponding metals and form $NH_4F$ or $NH_4HF_2$ gases.

2. The process of claim 1, wherein said aqueous solution contains a mole ratio of $F^-/NH_4^+$ of about 1/1 to about 1/0.2.

3. The process of claim 1, wherein said aqueous solution contains a reducing agent.

4. The process of claim 3, wherein said reducing agent is hydrazine.

5. The process of claim 1, wherein said $NH_4F$ or $NH_4HF_2$ gases are recycled to the step in which said organic solvent is brought into contact with said aqueous solution.

6. The process of claim 1, wherein said metal ammonium fluorides are heated to between 150° and 1000° C.

7. The process of claim 1, wherein said reducing gases include hydrogen, CO and hydrocarbon vapors.

8. The process of claim 1, wherein said inert gases include argon, helium, nitrogen and mixtures thereof.

9. The process of claim 1, wherein said $NH_4F$ and $NH_4HF_2$ gases are recovered by an absorption or dust collection step.

* * * * *